July 7, 1936.   H. T. WARNER   2,046,352
BARBECUE APPARATUS
Filed Feb. 15, 1936
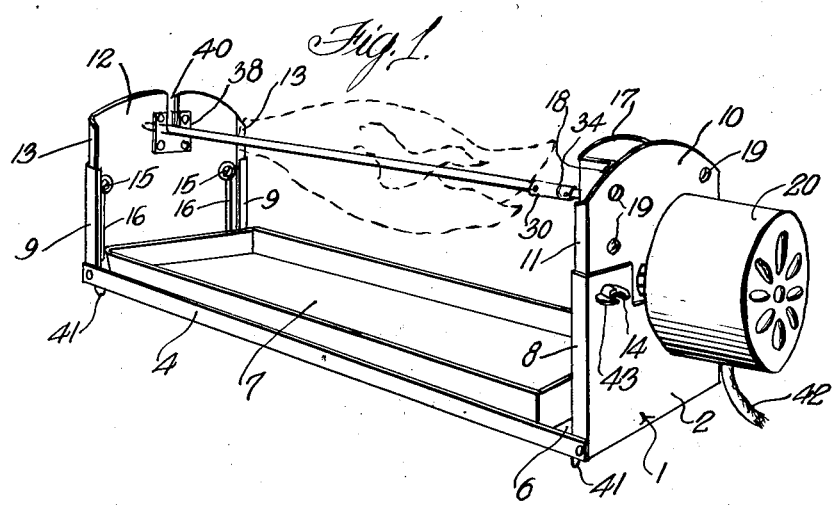
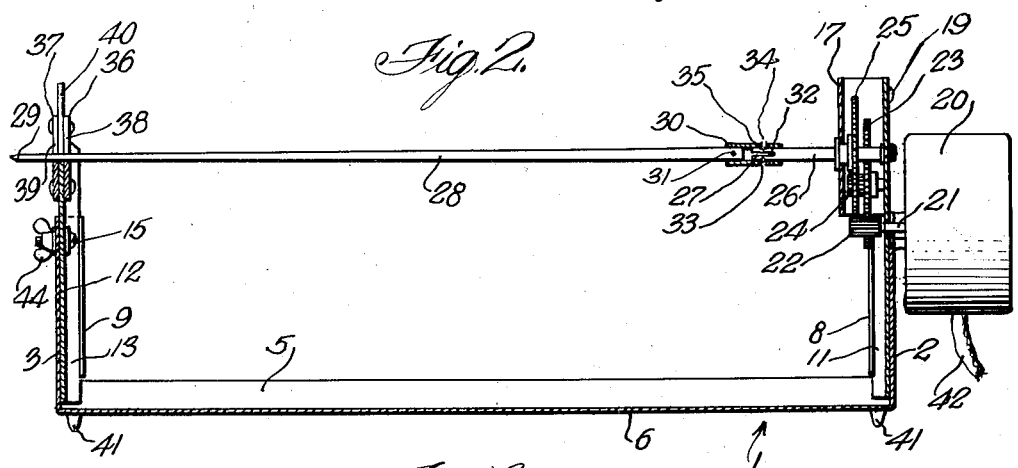
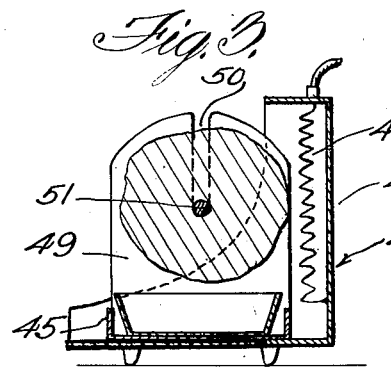
INVENTOR.
Henry T. Warner
BY Arnold Ehrlich
ATTORNEY.

Patented July 7, 1936

2,046,352

UNITED STATES PATENT OFFICE 2,046,352

BARBECUE APPARATUS

Henry T. Warner, Chicago, Ill.

Application February 15, 1936, Serial No. 64,008

5 Claims. (Cl. 53—5)

This invention relates to barbecue apparatus and more particularly to a device for broiling meat and fowl by revolving the same adjacent to a gas flame or electric heating unit. One of the objects of the invention is to provide a barbecue apparatus for home use which is adapted to be arranged within the broiling compartment of the ordinary home gas range. Another object of the invention is to provide a motor driven apparatus which is adapted to be connected to the ordinary light socket in the home. Another object of the invention is to provide a removable meat fork which may be inserted into the fowl or meat prior to being arranged in operative position. Another object of the invention is to provide adjustable supporting end plates whereby the fowl or meat may be mounted in the proper position for broiling. Another object of the invention is to provide a supporting frame having a heating unit arranged therein.

With these and other objects in view the invention wil be better understood by reference to the following specifications and the accompanying drawing wherein like numerals represent corresponding parts and, Figure 1 is a perspective view of the device.

Figure 2 is a longitudinal section with parts shown in elevation and,

Figure 3 is a cross sectional view of a slightly modified form of the invention.

Referring more particularly to the drawing 1 indicates a stationary frame having end walls 2 and 3, side bars 4 and 5, and a bottom wall 6. Arranged on the bottom wall 6 intermediate the end walls 2 and 3 is a removable gravy receiving dish 7. The end wall 2 has formed at the ends thereof guide members 8. The end wall 3 has formed at the ends thereof guide members 9. Slidably arranged in the end wall 2 is a slide plate 10 having inwardly extending lips 11 adapted to be slidably arranged in the guide members 8. Slidably arranged in the end walls 3 is a slide plate 12 having inwardly extending lips 13 adapted to be slidably arranged in the guide member 9. The end wall 2 has mounted therein bolts 14 adapted to be arranged in slots (not shown) in the slide plate 10 whereby the slide plates 10 may be moved upwardly or downwardly as desired. The end wall 3 has mounted therein bolts 15 adapted to be arranged in slots 16 in the slide plate 12 whereby the slide plates 12 may be moved upwardly or downwardly as desired. Mounted on the inner face of the slide plate 10 is a U-shaped supporting bracket 17 having outwardly extending flanges 18 adapted to be attached to the slide plate 10 by the bolts 19. Mounted on the slide plate 10 at the outer face thereof is an electric motor 20 having an armature shaft 21 adapted to have mounted thereon a driving pinion 22. The pinion 22 is adapted to have connection with a large gear 23 rotatably mounted on the slide plate 10. The gear 23 has mounted thereon a pinion 24 adapted to have connection with a large gear 25 fastened to a driving shaft 26. The driving shaft 26 is rotatably mounted in the slide plate 10 and the bracket 17 and has a slot 27 formed in the outer end thereof. A meat fork 28 having a sharpened end 29 has connected at its inner end a connecting sleeve 30 fastened at one end to the fork 28 by the pin 31. Transversely mounted in the sleeve 30 at its other end is a pin 32 adapted to be arranged in the slot 27. A spring 33 is mounted in slots 34 formed intermediate the ends of the sleeve 30 and is adapted to be arranged in grooves 35 formed in the inner end of the shaft 26 whereby to removably lock the meat fork and driving shaft together. Attached to the slide plate 12 in close proximity to the upper end thereof are reinforcing plates 36 and 37 having slots 38 and 39 respectively adapted to align with a slot 40 formed in the slide plate 12. The slots 38, 39, 40 are adapted to receive the free end of the meat fork 28 when in operative position. Supporting feet 41 formed at the lower face of the bottom wall 6 are adapted to support the frame 1.

In operation the meat fork 28 is removed from the driving shaft 26 and is inserted through the fowl or meat to be broiled or barbecued. The fork 28 is then attached to the shaft 26 by inserting the sleeve on the shaft 26 with the transverse pin 32 in the slot 27 and the spring 34 in the grooves 35. The device is then arranged in the broiling compartment of the ordinary home gas stove with the motor 20 extending outwardly of the compartment and the gas lighted. The connecting cord 42 having the usual connecting socket (not shown) is then connected to the ordinary light socket. When this connection is made the shaft 26 is revolved through the medium of the gears 22, 23, 24 and 25 at a reduced rate of speed thereby revolving the meat or fowl slowly within the oven. The slide plates 10 and 12 are adapted to be moved upwardly or downwardly within the guides 8 and 9 respectively whereby to gauge the proper position of the fowl with respect to the gas flame in the broiling compartment and locked in position by the wing nuts 43 and 44 on the bolts 14 and 15 respectively. During the broiling of the mounted fowl or meat the juice from the same is adapted to be received and collected in the dish 7.

In Figure 3 a slightly modified form of the invention is illustrated wherein the frame 45 has attached at one side thereof a heating unit 46 in any suitable manner. The heating unit comprises a rectangular frame 47 having an electric resistance coil 48 mounted therein in any suitable manner and connected to a source of electricity (not shown). Formed on the frame 45 are end walls 49 having a slot 50 adapted to receive the free end of the meat fork 51. With this arrangement the complete unit may be arranged in any suitable part of the kitchen and have the electric cord 42 of the motor 20 connected to a convenient electric outlet.

From the foregoing it will be seen that I have provided a simple and inexpensive device which is simple in construction and economical in manufacture and it is to be understood that various changes in the details of construction may be made without departing from the spirit of the invention.

Having thus described my invention what I claim is:

1. A device of the class described, including in combination, a frame comprising a base, side walls and end walls, said end walls having guides formed at the ends thereof, slide plates mounted adjacent said end walls having flanges formed at the ends thereof adapted to be slidably mounted in said guides, means for adjustably locking said end walls and slide plates together, a shaft rotatably mounted in one of said end plates, means for rotating said shaft, a meat rod detachably connected to said shaft adapted to be rotated therewith, the other of said slide plates having a slot formed at the upper end thereof adapted to removably receive the free end of said rod.

2. A device of the class described, including in combination, a frame comprising a base, side walls and end walls, said end walls having guides formed at the ends thereof, slide plates mounted adjacent said end walls having flanges formed at the ends thereof adapted to be slidably mounted in said guides, means for adjustably locking said end walls and slide plates together, a shaft rotatably mounted in one of said end plates and means for rotating said shaft, a meat rod detachably connected to said shaft adapted to be rotated therewith, the other of said slide plates having a slot formed at the upper end thereof adapted to removably receive the free end of said rod, meat or fowl adapted to be mounted on said rod, and means for heating said meat or fowl.

3. A device of the class described, including in combination, a frame comprising a base, side walls and end walls, said end walls having guides formed at the ends thereof, slide plates mounted adjacent said end walls having flanges formed at the ends thereof adapted to be slidably mounted in said guides, means for adjustably locking said end walls and slide plates together, a shaft rotatably mounted in one of said end plates, means for rotating said shaft, a meat rod detachably connected to said shaft adapted to be rotated therewith, the other of said slide plates having a slot formed at the upper end thereof adapted to removably receive the free end of said rod, meat or fowl adapted to be mounted on said rod, means for heating said meat or fowl, an auxiliary frame carried by said base, and a resistance coil mounted in said auxiliary frame adapted to have connection with a source of electricity whereby to heat said meat or fowl.

4. A device of the class described, including in combination, a frame comprising a base, side walls and end walls, said end walls having guides formed at the ends thereof, slide plates mounted adjacent said end walls having flanges formed at the ends thereof adapted to be slidably mounted in said guides, means for adjustably locking said end walls and slide plates together, a shaft rotatably mounted in one of said ends plates, an electric motor mounted on one of said end plates, a gear train forming connection between said shaft and motor, a meat rod detachably connected to said shaft adapted to be rotated therewith, the other of said slide plates having a slot formed at the upper end thereof adapted to removably receive the free end of said rod.

5. A device of the class described, including in combination, a frame comprising a base, side walls and end walls, said end walls having guides formed at the ends thereof, slide plates mounted adjacent said end walls having flanges formed at the ends thereof adapted to be slidably mounted in said guides, means for adjustably locking said end walls and slide plates together, a shaft rotatably mounted in one of said end plates, means for rotating said shaft, a meat rod having a sleeve attached to one end having pin and slot connection with said shaft, means for locking said rod and shaft together, said shaft adapted to be rotated therewith, the other of said slide plates having a slot formed at the upper end thereof adapted to removably receive the free end of said rod.

HENRY T. WARNER.